US011551205B2

(12) United States Patent
Bederov et al.

(10) Patent No.: US 11,551,205 B2
(45) Date of Patent: Jan. 10, 2023

(54) METHOD FOR PRODUCING A CRYPTOGRAPHICAL SIGNED TRANSACTION

(71) Applicant: PLC Group AG, Zug (CH)

(72) Inventors: Denis Bederov, Berlin (DE); Denis Donin, Moscow (RU)

(73) Assignee: PLC Group AG, Zug (CH)

( * ) Notice: Subject to any disclaimer, the term of this patent is extended or adjusted under 35 U.S.C. 154(b) by 757 days.

(21) Appl. No.: 15/944,610

(22) Filed: Apr. 3, 2018

(65) Prior Publication Data

US 2018/0285866 A1 Oct. 4, 2018

(30) Foreign Application Priority Data

Apr. 3, 2017 (EP) ..................................... 17164564

(51) Int. Cl.
*G06Q 20/38* (2012.01)
*H04L 9/32* (2006.01)
(Continued)

(52) U.S. Cl.
CPC ....... *G06Q 20/3825* (2013.01); *G06Q 20/065* (2013.01); *G06Q 20/10* (2013.01); *H04L 9/3247* (2013.01)

(58) Field of Classification Search
CPC ............... G06Q 20/3825; G06Q 20/10; G06Q 20/065; H04L 9/3247
See application file for complete search history.

(56) References Cited

U.S. PATENT DOCUMENTS

| 7,949,600 B1 * | 5/2011 | Portillo | ................. G06Q 20/04 705/39 |
| 2008/0272188 A1 * | 11/2008 | Keithley | ............ G06Q 30/0641 235/379 |

(Continued)

FOREIGN PATENT DOCUMENTS

| CN | 107004195 A | * | 8/2017 | .......... G06Q 20/027 |
| WO | WO-2017081620 A2 | * | 5/2017 | .......... G06F 16/337 |
| WO | WO-2018132108 A1 | * | 7/2018 | ......... G06F 16/2308 |

OTHER PUBLICATIONS

Andreas M. Antonopoulos: "Mastering Bitcoin—Unlocking Digital Cryptocurrencies"; In: "Mastering bitcoin: [unlocking digital cryptocurrencies]", Dec. 20, 2014 (Dec. 20, 2014), O'Reilly Media, Beijing Cambrige Farnham Köln Sebastopol Tokyo, XP055306939, ISBN: 978-1-4493-7404-4; p. 111-122; Link to document: https://books.google.de/books?id=IXmrBQAAQBAJ&printsec=frontcover&dq=Andreas+M.+Antonopoulos:+%22Mastering+Bitcoin+%E2%80%93+Unlocking+Digital+Cryptocurrencies%22&hl=de&sa=X&ved=0ahUKEwjO6N6B2cjaAhVCIJoKHaTOAe6Q6AEIKDAA#v=onepage&q=Andreas%20M.%20Antonopoulos%3A%20%22Mastering%20Bitcoin%20%E2%80%93%20Unlocking%20Digital%20Cryptocurrencies%22&f=false.

(Continued)

*Primary Examiner* — Patrick McAtee
*Assistant Examiner* — Vincent I Idiake
(74) *Attorney, Agent, or Firm* — Kilpatrick Townsend & Stockton LLP

(57) ABSTRACT

The invention relates to a method for producing a cryptographically signed transaction for the transfer of an amount of a currency within a blockchain. The transaction comprises one or more inputs and one or more outputs. The method comprises:
retrieving the one or more inputs, the inputs being a reference to one or more previous transactions,
(Continued)

determining the one or more outputs, each output defining an amount to be transferred to a receiver indicated in the respective output, adding security information, the security information defining directly or indirectly a maximum amount to be spent with the transaction, and cryptographically signing the transaction by adding signature information.

5 Claims, 1 Drawing Sheet

(51) Int. Cl.
*G06Q 20/10* (2012.01)
*G06Q 20/06* (2012.01)

(56) References Cited

U.S. PATENT DOCUMENTS

| | | |
|---|---|---|
| 2015/0052066 A1 | 2/2015 | Vincent et al. |
| 2016/0330031 A1* | 11/2016 | Drego .................. H04L 9/3239 |
| 2016/0342977 A1* | 11/2016 | Lam .................. G06Q 20/0658 |
| 2016/0358165 A1 | 12/2016 | Maxwell |
| 2017/0132621 A1* | 5/2017 | Miller .................. G06Q 20/065 |
| 2017/0330164 A1* | 11/2017 | Suelberg .............. G06Q 10/087 |

OTHER PUBLICATIONS

Satoshi Nakamoto: "Bitcoin: A Peer-to-Peer Electronic Cash System", Jan. 13, 2009 (Jan. 13, 2009), XP055386799.

European Search Report in related European Patent Application No. 17164564.1 dated Oct. 9, 2017 (two pages).

* cited by examiner

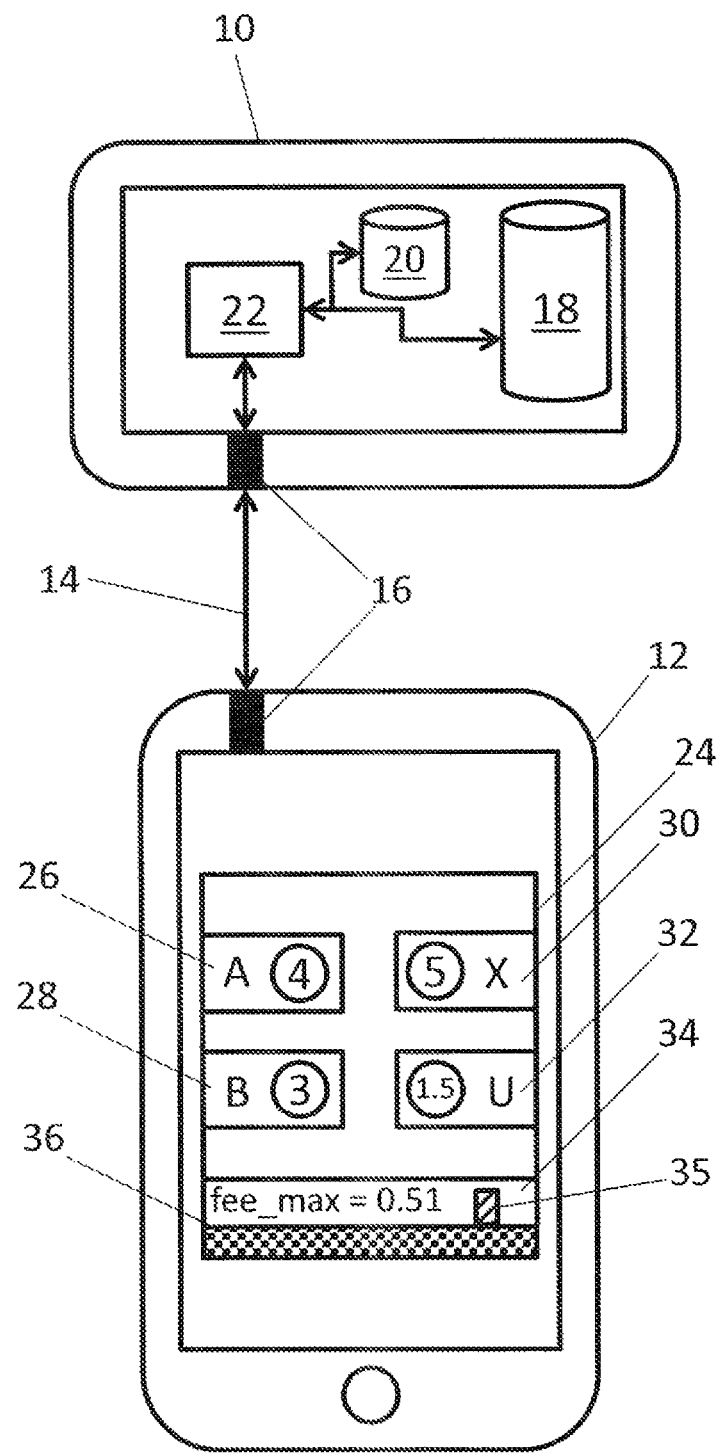

METHOD FOR PRODUCING A CRYPTOGRAPHICAL SIGNED TRANSACTION

This application claims priority to European Patent Application No. 17164564.1, filed Apr. 3, 2017, the disclosure of which is incorporated by reference herein.

The present invention relates to a method for producing a, preferably cryptographically, signed transaction. The transaction is used for the transfer of an amount of a currency within a blockchain. The transaction comprises one or more inputs and one or more outputs.

Blockchains can be used for providing a currency, e.g. in the form of "digital money". One well-known example of such a currency is Bitcoin, which is a crypto-currency that is based on a peer-to-peer network. Other digital currencies include Litecoin or Primecoin.

In order to transfer amounts of such a currency within the blockchain, transactions are used, which usually are signed using some form of cryptographic method. Such transactions can be produced by wallets. The transaction defines the amount (e.g. the amount of "coins") that one user is willing to transfer to another user. A transaction can be processed by nodes of the blockchain. The nodes can form the above-mentioned peer-to-peer network. As soon as several nodes have verified a transaction (i.e. checked the transaction for correctness), the transaction can be regarded as valid.

The transaction can comprise one or more inputs or "unspent" inputs, which indicate an amount of currency the user possesses (i.e. a credit balance). In other words, the inputs define how much the user can spend with the transaction. These inputs can be received from one of the nodes of the blockchain.

Furthermore, the transaction can comprise one or more outputs. Each output indicates how much of the currency is to be transferred to a specific account. For example, each output can indicate one account number and the amount of currency that is to be transferred to the respective account number.

If a difference between the inputs and the outputs exists, i.e. the combined amount of the inputs is greater than the combined amount of the outputs, the difference between the inputs and the outputs can then be regarded as a service fee or transaction fee for the entity or node processing the transaction.

However, the inputs of the transaction do not directly state the amount of the currency linked to the input. Instead the inputs may only be a reference to one or more previous transactions. Thus, the inputs do not clearly state the amount of currency that is linked to the respective input. This leads to the possibility that the inputs can be manipulated. Such manipulation can be performed e.g. by a compromised node. The nodes can be regarded as "untrusted area", as a user has no control over the nodes and can therefore not be aware of a malicious node. Also, a manipulation of the inputs is possible by altering the inputs during their transport from the node to the wallet, e.g. by a man-in-the-middle attack.

Generally, two different scenarios based on manipulated inputs exist. Firstly, the inputs can be manipulated such that the user (or a device/wallet used for producing the transaction) believes that the maximum amount that can be spent within the transaction (based on the inputs) is higher than it actually is. In this scenario, the user will spend more currency than allowed, i.e. the accumulated amount of the outputs will be higher than the actual accumulated amount of the inputs. Such a transaction will be rejected by the blockchain, as the blockchain notices that the amount of the outputs is greater than the actual amount of the inputs. Consequently, no real damage occurs, only an invalid transaction is produced.

However, the second scenario can lead to a loss of currency for the user. In the second scenario the inputs are manipulated such that the user (or a device/wallet used for producing the transaction) is made to believe that the maximum amount that can be spent within the transaction (based on the inputs) is lower than it actually is. Consequently, the user will spend a smaller amount of currency than it would actually be possible, leading to an unintentionally high transaction fee (the difference between the inputs and the outputs is unintentionally high). Due to such manipulation, it is possible that a user pays a too high transaction fee without noticing.

It is therefore the object of the present invention to improve the security of transactions for the transfer of an amount of a currency within a blockchain.

This object is solved by a method in accordance with the independent claim.

Such a method is suitable for producing a, preferably cryptographically, signed transaction. The transaction is used for the transfer of an amount of a currency within a blockchain. The transaction comprises one or more inputs and one or more outputs. The method comprises:

retrieving the one or more inputs, the inputs being a reference to one or more previous transactions, determining the one or more outputs, each output defining an amount to be transferred to a receiver indicated in the respective output, adding security information, the security information e.g. defining directly or indirectly a maximum amount to be spent with the transaction, and preferably cryptographically signing the transaction by adding signature information.

As indicated above, the transaction comprises one or more inputs and one or more outputs. The inputs are a reference to one or more previous transactions and thereby define an amount of the currency that can be spent within the transaction. The outputs respectively indicate, e.g. an account number and an amount to be transferred to the respective account number.

The invention is based on the finding that by adding the security information, the maximum amount to be spent within the transaction is over-determined, as it is determined firstly by the (accumulated) inputs and secondly by the security information. Preferably, the security information is added by the user or by a device of the user producing the transaction, so that not only the outputs but also a transaction fee is actively determined. As the security information adds a further definition of the maximum amount to be spent within the transaction, the manipulation of the inputs (e.g. due to a manipulated or compromised node) cannot lead to the spending of an unintentionally high transaction fee. Thereby the security of the transaction is strongly improved. In other words, the security information prohibits that manipulated inputs lead to the spending of too many coins.

In the following, certain aspects of the method of the invention will be explained in more detail.

Particularly the method of the invention can be performed on a wallet device, for example a handheld computer or a smartphone. The wallet device can also be named an e-wallet or a crypto wallet.

When the transaction is produced, the inputs can be retrieved from a node of the blockchain, particularly using an internet or data connection. A blockchain is a distributed database that maintains a continuously-growing list of ordered records (e.g. transactions) called blocks. Each block can contain a time stamp and a link to a previous block.

The outputs can be entered or indicated by a user, e.g. using a keyboard or other means to supply an account number and the amount of currency that is to be transferred to said account number.

After the security information has been added to the transaction, the transaction can be cryptographically signed. The signature information added by signing the transaction can comprise a hash-value, wherein one or more of the inputs, one or more of the outputs, the security information, a private key of the user and/or a public key of the user are entered into the hash function. The hash-value can then be encrypted with the private key of the user. The signature information can also comprise the public key of the user. The signature information provides for the authentication that the transaction is actually produced by the user holding the private and public key and has not been changed during the transfer of the transaction. The hash function utilized for producing the signature information can be a cryptographic hash function.

When the transaction is signed and thus completed, the transaction can be transferred to a node of the blockchain, again e.g. using an internet or data connection. Thereby, the inputs, the outputs, the security information and the signature information can be transferred to the node. The transaction may further comprise a time stamp and/or a public key of the user signing the transaction. The node can then verify the transaction. Preferably the node checks and considers the security information, wherein the node rejects the transaction, if the amount that would actually be spent with the transaction exceeds the maximum amount to be spent given in the security information.

As an example, a user U produces a transaction on a wallet device, wherein a first and second input is used. The first input is a reference to a previous transaction wherein user U received four coins of a currency from user A. The second transaction refers to a previous transaction wherein the user U received three coins from user B. User U wants to transfer five coins to user X and wants to spend 0.5 coins as a transaction fee. The amount of coins that is not to be transferred (i.e. 4+3−5−0.5=1.5) has to be transferred back to the user U himself. Consequently, a first output identifying the account number of user X and the amount of five coins is produced. A second output indicating the account number of user U himself and an amount of 1.5 coins is also produced. The security information then defines that the maximum amount to be spent within the transaction is seven coins thereby automatically/indirectly defining the transaction fee as 0.5 coins.

If all amounts within the transaction are correct, then the node processing the transaction will verify or approve the transaction. However, if for example the input referring to user A has been manipulated and not only four but forty coins from user A can be spent, wherein user U believes that only four coins can be spent (which would lead to a transaction fee of 40+3−5−1.5=36.5 coins), then the node will determine that 43 (40+3) coins are going to be spent within the transaction, which exceeds the maximum amount to be spent defined by the security information (i.e. seven coins), and will thus reject the transaction. A malicious manipulation of the transaction that would lead to the loss of currency for the user can thereby be prevented.

To further improve the security of the transaction, the inputs can mention or comprise an amount that can be transferred within the transaction. In other words, the inputs can not only be a reference to a previous transaction but e.g. state in clear-text the amount of currency that can be spent or transferred due to the respective input. For the same purpose, the inputs can also comprise the complete previous transaction that is the base for the respective input. Furthermore, the inputs can also comprise at least parts of a transaction that is the base for the previous transaction (i.e. the second to last transaction). The information of the last transaction and/or the second to last transaction can be used to determine the amount of currency that can be spent due to the respective input.

Additionally or alternatively the combined amount of currency of all inputs can be indicated, e.g. in clear-text.

Advantageously, the security information can comprise information about the accumulated amount of the inputs. Particularly the security information can state the accumulated amount of the inputs, i.e. the amount that the inputs are believed to indicate. Thereby the security information defines the amount that is to be spent with the transaction, as the accumulated amount of the inputs is spent with the transaction (either as output or as transaction fee).

It is further preferred if the security information directly or indirectly defines a maximum transaction fee to be spent. Particularly, the security information can state a number that defines the maximum transaction fee for the respective transaction. Together with the outputs (i.e. the amounts to be spent) the security information thereby indirectly defines the maximum amount to be spent within the transaction. The security information can also directly define the transaction fee, i.e. not the maximum transaction fee but the actual amount intended to be spent as transaction fee.

Advantageously the security information also comprises contractual data, particularly a digital representation of a contract. The contractual data, e.g. data of the contract underlying the payment or transfer triggered with the transaction, can preferably comprise a digital photo of a signed contract and/or a photograph of the signing person or the signing persons. Alternatively or additionally, the contractual data can comprise a hash-value e.g. of the digital representation of the contract. Further alternatively or additionally the passports (or the machine readable information contained in many passports) of the signing persons can also be included in the security information (e.g. as hash-value). For example, if a smartphone is used for producing the transaction, a camera of the smartphone can be utilized to take the photographs of the signed contract, the signing person(s) and/or the passport(s) of the signing person(s). Thereby additional security can be added to the transaction, as the contract underlying the transfer of the currency can easily be proven.

By means of the additional information in the security information, a transaction can be prepared in an offline environment (such as in an airplane), wherein the additional information, e.g. the photograph of the contract, allows to prove that a contract exists. To allow transactions to be prepared in an offline environment, current inputs can be stored before entering the offline environment. Thus, no e.g. Internet connection is necessary at the time of the production of the transaction.

Preferably the signature information comprises a public and/or private key of a user signing the transaction and/or a hash-value of at least parts of the inputs and/or the outputs. Further preferably an Elliptic Curve Digital Signature Algorithm (ECDSA) is used to sign the transaction.

The invention further relates to a wallet device for producing, preferably cryptographically, signed transactions for the transfer of an amount of a currency within a blockchain.

The wallet device is adapted to execute the method disclosed above. The wallet device comprises:
- a network interface for receiving at least one or more inputs,
- interface means for entering an amount to be transferred to a receiver and a maximum amount to be spent within a transaction,
- a processing unit, the processing unit being adapted to produce the transaction by determining security information, by determining outputs from the entered amount to be transferred and by cryptographically signing the transaction.

The network interface can establish an internet or data connection to the blockchain. The interface means can e.g. be a keyboard, a touchscreen or a camera. The camera can be used for taking photos of a contract and/or for the scanning of an account number, e.g. in the form of a QR-(Quick Response-)code.

The explanations and disclosure relating to the method for producing a cryptographically signed transaction are also valid for the wallet device of the invention.

As the wallet device is able to provide the security information within a transaction, the wallet device can retrieve the inputs from nodes of the blockchain without danger. Consequently the wallet device does not require a full or partial database storing all of or parts of the transactions of the blockchain. Therefore, according to the invention, an ultra-thin wallet can be established that does not require large data storage. Due to the minimum requirements for data storage, the wallet device of the invention preferably requires only low-standard hardware and can thus be produced without high costs. Alternatively also existing hardware (e.g. a smartphone) can be used as a wallet device.

The invention further relates to a method for retrieving information required for transactions of a blockchain, the method comprising:
- receiving a request for inputs of one of a plurality of accounts,
- searching among stored inputs of the plurality of accounts for the inputs of the requested account,
- providing the inputs of the requested account.

In other words, the method allows delivering the inputs for any user or even for all users of the blockchain. Thereby it is possible that a wallet device can contact any node of the blockchain for retrieving the inputs, leading to a simplified production of transactions.

The invention further relates to a node device for a blockchain, the node device being adapted to execute the method for retrieving information, wherein the node device comprises
- a first database storing transactions of the blockchain,
- a second database for indexing inputs of a plurality of accounts, and
- a processing unit adapted to provide inputs indexed in the second database upon receiving a request for the inputs of one of the accounts.

In the first database most of or all transactions of the blockchain can be stored. This can lead to a very large first database, wherein the first database would require a long period of time to search for inputs of a specific user or account. Therefore, the second database is set up such that it indexes the inputs of the accounts, particularly of all accounts stored in the blockchain. Thereby the second database preferably has an optimized structure and only has to store the inputs thus leading to a relatively small and fast database. Requests for inputs of any account can therefore be served within a short response time. The second database therefore allows a very fast retrieval of inputs, particularly in real time. A real time retrieval can mean that the node device can provide requested inputs within a guaranteed response time, e.g. within less than 100 ms or preferably within less than 10 ms.

Preferably the second database can only store a predefined number of the newest transactions of predefined accounts. For example, only the last 2, 4, 5, 10 or 20 inputs of each account can be stored in the second database, thus allowing an even smaller second database.

Preferably the node device can have a communication or network interface in order to establish an internet or data connection to other nodes and/or to wallet devices. The node device can also be adapted to be able to verify transactions within the blockchain.

Advantageously the processing unit is adapted to derive the second database from the first database. For that purpose the processing unit can scan the first database and extract and/or index all or only the newest inputs.

The invention further relates to a system comprising a wallet device and a node device as disclosed above. The wallet and the node device can be coupled via a data connection, particularly via the Internet.

Finally, the invention relates to a computer program product stored on a computer usable medium. The computer program product comprises computer-readable program means for causing a computer to execute a method for producing a cryptographically signed transaction and/or a method for retrieving information, as disclosed above.

The disclosure related to the methods of the invention also relates to the computer program product of the invention.

Various features and advantages of the present invention will become more apparent from the following description and accompanying drawing, wherein:

FIG. 1 shows a node device and a wallet device which produce and verify a transaction within a blockchain.

FIG. 1 shows a node 10 (e.g. a server on the Internet) which is connected to a wallet 12 (e.g. a smartphone having a wallet software) via an Ethernet-connection 14. To establish the Ethernet-connection 14, both the node 10 and the wallet 12 comprise an Ethernet module 16 (e.g. a wireless LAN device).

Via the Ethernet module 16, the node 10 can also be connected with further nodes 10 (not shown), wherein the nodes 10 all belong to a blockchain.

The node 10 comprises a first database 18 which stores all transactions of the blockchain. The node 10 further comprises a second database 20 that stores and indexes the last ten inputs of each account number within the blockchain. The node 10 is further running a soft- and middleware 22 that allows to derive the second database 20 from the first database 18 and to provide inputs to the wallet 12.

The wallet 12 comprises a processing unit (not shown) that executes software on the wallet 12 that allows a transaction 24 to be produced on the wallet 12. The wallet 12 belongs to a user U, wherein the user U wants to transfer a certain amount of coins to a user X. The wallet 12 then retrieves the inputs belonging to the user U from the node 10 (wherein the node 10 retrieves the inputs from the second database 20). The node 10 may deliver a first input 26 to the wallet 12, wherein the first input 26 refers to a previous transaction from user A to user U, wherein user U received four coins. Also a second input 28 is retrieved from the node 10, wherein the second input 28 states that user B has previously sent three coins to user U.

Therefore user U can spend a maximum of seven coins. User U wants to transfer five coins to user X. User U enters this information via a touchscreen of the wallet 12, resulting in the wallet 12 producing a first output 30 indicating the account number of user X and the amount of five coins. Also, user U wants to spend 0.5 coins as transaction fee. This results in an amount of 1.5 coins that is indicated in a second output 32, wherein this amount is transferred back to the account of the user U. The amount that is transferred back to user U can also be termed "change".

In order that not more than the transaction fee of 0.5 coins as planned by user U is spent, the wallet 12 produces security information 34 which indicates that the maximum transaction fee (fee_max) should be 0.51 coins (slightly more than 0.5 due to rounding operations). The security information 34 thereby indirectly defines a maximum amount that can be spent with the transaction 24. The security information 34 can also comprise a digital photo 35 of a contract underlying the transaction 24.

Finally, the wallet 12 also signs the transaction 24 with signature information 36 after the user U has entered e.g. a password into the wallet 12.

The now completed transaction 24 is then transferred to the node 10, wherein the node 10 processes and verifies the transaction 24. Particularly the transaction 24 is transferred via the Ethernet-connection 14 to the node 10. The node 10 checks all inputs 26, 28 and outputs 30, 32 as well as the security information 34 and the signature 36. If all information appears correct, the node 10 verifies the transaction 24 and then stores the transaction 24 within the blockchain and thus within the first database 18. As soon as the transaction 24 is verified by other nodes, the user X can spend the coins received from user U in further transactions 24.

However, if node 10 finds that the transaction fee that is to be spent exceeds the maximum transaction fee (fee_max) defined in the transaction 24, node 10 will reject the transaction 24.

Due to the security information 34 the security of the transaction 24 against manipulation is strengthened, thereby preventing the user U from unintentionally spending too many coins, e.g. by paying an unintentionally high transaction fee.

LIST OF REFERENCE NUMERALS 10 node
12 wallet
14 Ethernet-connection
16 Ethernet module
18 first database
20 second database
22 soft- and middleware
24 transaction
26 first input
28 second input
30 first output
32 second output
34 security information
35 digital photo
36 signature information

The invention claimed is:

1. A method for producing a cryptographically signed transaction with a wallet device comprising a network interface configured for receiving one or more inputs and communicating with one or more nodes of a blockchain, a user interface configured for receiving at least one user input, and a processing unit configured to produce the cryptographically signed transaction for a transfer of an amount of a currency within the blockchain, the method comprising the steps of:

retrieving, with the network interface of the wallet device, the one or more inputs from the one or more nodes of the blockchain, wherein each of the one or more inputs comprises a reference to one or more previous transactions for a transaction to transfer of an amount of currency within the blockchain associated with the wallet device;

receiving, via the user interface of the wallet device, a first user input, wherein the first user input defines an amount of currency to be transferred to one or more receivers;

receiving, via the user interface of the wallet device, a second user input, wherein the second user input defines an amount of currency for a transaction fee;

generating, by the wallet device, one or more outputs, wherein each of the one or more outputs defines a receiver of the one or more receivers and an amount of currency to be transferred to the receiver of the one or more receivers indicated in each of the respective outputs, and wherein the one or more outputs are generated based on at least the amount of currency defined by the first user input;

generating, by the wallet device, a security information value based on the amount of currency of the transfer referenced in the one or more inputs and based on the amount of currency for the transaction fee defined by the second user input, wherein the security information value is generated in addition to the one or more inputs, and is configured to define directly or indirectly a control sum associated with the transaction, the control sum including (1) the amount of currency to be transferred to one or more receivers, (2) the amount of currency for the transaction fee associated with the transaction, and (3) any amount of currency to remain or transferred back to the wallet device;

incorporating, by the wallet device, the security information value into the transaction in addition to the one or more inputs;

cryptographically signing, by the wallet device, the transaction by adding signature information thereby producing the cryptographically signed transaction, wherein the signature information is separate from the security information value; and sending, by the network interface of the wallet device, the cryptographically signed transaction to the one or more nodes of the blockchain, wherein the cryptographically signed transaction comprises:
the one or more inputs;
the one or more outputs;
the security information value; and
the signature information, wherein the security information value prevents an actual sum of (1) an actual amount of currency to be transferred to one or more receivers, (2) an actual amount of currency for the transaction fee associated with the cryptographically signed transaction, and (3) any actual amount of currency to remain or transferred back to the wallet device that is verifiable by the one or more nodes the cryptographically signed transaction is sent to, from exceeding the control sum, and wherein the cryptographically signed transaction is rejected by the one or more nodes when the actual sum exceeds the control sum defined in the security information value.

2. The method of claim 1, wherein
the one or more inputs comprise an amount that can be transferred within the transaction.

3. The method of claim 1, wherein
the security information value also comprises contractual data.

4. The method of claim 3, wherein
the contractual data comprises a digital representation of a contract.

5. The method of claim 1, wherein the signature information comprises at least one of a public key of a user signing the transaction, a private key of a user signing the transaction, a hash value of at least parts of the inputs and a hash value of at least parts of the outputs.

\* \* \* \* \*